US007769618B2

(12) United States Patent  (10) Patent No.: US 7,769,618 B2
Levanon  (45) Date of Patent: Aug. 3, 2010

(54) METHOD AND COMPUTER PROGRAM PRODUCT FOR EVALUATING A PROJECT

(76) Inventor: Tal Levanon, 113 Lilac St. POB 1466, Re'ut-Modi'in 71908 (IL)

(*) Notice: Subject to any disclaimer, the term of this patent is extended or adjusted under 35 U.S.C. 154(b) by 786 days.

(21) Appl. No.: 11/361,809

(22) Filed: Feb. 23, 2006

(65) Prior Publication Data

US 2006/0212325 A1   Sep. 21, 2006

Related U.S. Application Data

(60) Provisional application No. 60/661,929, filed on Mar. 16, 2005.

(51) Int. Cl.
*G06F 9/46* (2006.01)
(52) U.S. Cl. ........................................................ 705/8
(58) Field of Classification Search .................... 705/7
See application file for complete search history.

(56) References Cited

U.S. PATENT DOCUMENTS

| | | | | |
|---|---|---|---|---|
| 5,172,313 | A * | 12/1992 | Schumacher | 705/7 |
| 5,237,514 | A * | 8/1993 | Curtin | 716/10 |
| 7,171,375 | B2 * | 1/2007 | Clarke | 705/8 |
| 2003/0233303 | A1 * | 12/2003 | Elazouni | 705/36 |
| 2007/0033591 | A1 * | 2/2007 | Kline et al. | 718/102 |

OTHER PUBLICATIONS

Swiler, LP; et al Computer-Attack grahp generation tool, DISCEX'01 Proceedings, 2001, pp. 307-321.*
Goodpasture, John C.; Quantitative Methods in Project Management; J.Ross Publishing, 2003.*
HCP Website, Sep. 2004.*
Levanon, Tal "Analysis Tool Helps Project Managers Expose Hidden Pitfalls." Compound Semiconducter, Apr. 2006.*
PMICOS 2009 Homepage.*
Swiler, LP; et al Computer-Attack graph generation tool, DISCEX'01 Proceedings, 2001, pp. 307-321.*
Goodpasture, John C.; Quantitative Methods in Project Management; J.Ross Publishing, 2003, ISBN 1932159150.*
Genaro J Gutierrez, Anand Paul. Robustness to variability in project networks. IIE Transactions [serial online]. 2001;33:649-660. Available from: ABI/INFORM Global. Accessed Aug. 25, 2009, Document ID: 75362496.*
Chen, Shyi-Ming and Chang, Tao-Hsing, "Finding Multiple Possible Critical Paths using Fuzzy PERT", IEEE Transactions on Systems, Man, & Cybernetics, Part B: Cybernetics. vol. 31, No. 6, Dec. 2001. pp. 930-937.
Dodin Bajis, "Determining the Top K-Critical Paths in PERT Networks", Operations Research, vol. 32, No. 4, Jul.-Aug. 1984. pp. 859-877.
Dodin, Bajis M. and Elmaghraby, Salah E., "Approximating the Criticality Indices of the Activities in PERT Networks", Management Science. vol. 31, No. 2, Feb. 1985, pp. 207-223.

(Continued)

*Primary Examiner*—Scott L Jarrett
*Assistant Examiner*—George H Walker
(74) *Attorney, Agent, or Firm*—Reches Patents

(57) ABSTRACT

A method and computer program product, for evaluating a project, the method includes: receiving task timing information and task relationship information; locating at least one hidden critical path; and estimating a robustness of the project in response to at one characteristic of the at least one hidden critical path.

10 Claims, 3 Drawing Sheets

OTHER PUBLICATIONS

Nagy, Bruce M., President, BMN International, "Using the Critical Task Method with the Critical Path Method", Proceedings of the 30th Annual Project Management Institute 1999 Seminars & Symposium Philadelphia, Pennsylvania, USA.

* cited by examiner

METHOD AND COMPUTER PROGRAM PRODUCT FOR EVALUATING A PROJECT

RELATED APPLICATIONS

This application is a NONPROVISIONAL of, claims priority to and incorporates by reference U.S. Provisional Patent Application 60/661,929, filed 16 Mar. 2005.

FIELD OF THE INVENTION

The invention relates to methods and computer program product for evaluating a project.

BACKGROUND OF THE INVENTION

Various methods for analyzing projects are known in the art. They usually start by receiving task timing information representing the duration of a task and receiving task relationship information representative of relationships between tasks. The task timing information usually includes the task's slack or float—the amount of time the start of the task can be delayed without delaying the project.

This task timing information and task relationship information are processed to provide a network that represents the project and especially represents different project paths (also referred to as paths).

Paths include multiple tasks that are related to each other. Theoretically there are four types of task relationship information: finish to start, start to start, start to finish and finish to finish task relationship information. Finish to start relationship means that a second task (or activity) that depends upon a first task cannot start until the first task is finished.

Usually, the longest path through the network diagram is called the critical path. The activities on the critical paths are called critical activities. Tasks on critical path have zero slack.

The most known project analysis methods are the critical path method (CPM) and the project evaluation and review technique (PERT). CPM analyses a project and provides the project's critical path. The critical path includes all the activities that will have a direct impact on the project end-date, if their duration will extend. Both CPM and PERT use only finish to start relationships. Both CPM and PERT use AON (Activity On Node) diagrams that do not support looping.

U.S. patent application serial No. 2003/0067492A1 of Cadwallaher and PCT patent application publication serial number WO94/16393 OF Engelman, all being incorporated herein by reference, describe method for evaluating projects, and especially methods that are base upon CPM.

Both PERT and CPM were criticized in the past as providing insufficient information to project managers, especially when the analyzed project is complex and also include many tasks.

There is a growing need to provide effective methods and computer readable mediums for analyzing networks, especially large and complex networks.

SUMMARY OF THE INVENTION

A method for evaluating a project is provided. The method includes: receiving task timing information and task relationship information; locating at least one hidden critical path; and estimating a robustness of the project in response to at one characteristic of the at least one hidden critical path.

A computer program product is provided. The computer program product includes a computer usable medium that includes a computer readable program, wherein the computer readable program when executed on a computer causes the computer to receive task timing information and task relationship information; locating at least one hidden critical path; and estimate a robustness of the project in response to at one characteristic of the at least one hidden critical path.

Conveniently, the method includes removing redundant hidden critical paths.

Conveniently, the method includes calculating path duration slack for multiple paths in the network.

Conveniently, the method includes ignoring paths that are characterized by a path duration slack that is smaller than a path duration slack threshold.

Conveniently, the method includes generating a network representative of the project in response to finish to start task relationship information.

Conveniently, the method includes generating a network representative of the project in response to start to start task relationship information.

Conveniently, the method includes generating a network representative of the project in response to finish to finish task relationship information.

Conveniently, the method includes validating the received task information and task relationship information by comparing between the duration of the longest path in a network representative of the project and between the duration of the critical path in the network.

Conveniently, the method includes computing a robustness score that is responsive to the duration of a critical path of the project and to a distribution of path durations of multiple hidden critical paths.

Conveniently, the method includes calculating task duration standard deviation and a task duration average; and evaluating the duration of tasks in response to a relationship between the duration of the tasks, the task duration standard deviation and the task duration average.

Conveniently, the method includes evaluating a length of a project in response to relationship between the duration of a longest path in a network representative of the project and between a duration of a critical path in the network.

DESCRIPTION OF THE DRAWINGS

The present invention will be understood and appreciated more fully from the following detailed description taken in conjunction with the drawings in which.

DETAILED DESCRIPTION OF THE DRAWINGS

A method and a computer program product for evaluating a project, and especially for evaluating the robustness of a project and/or predicting the project success rate at the time point of the project network in response to the presence of critical paths as well as hidden critical paths. Hidden critical paths can have a duration that is close and even very close to the duration of the critical path. The amount of hidden critical paths as well as the difference between their duration and the duration of the critical path can determine the robustness of a project.

The method and computer program product define paths characteristics, these characteristics include the slack of the path (also referred to as "path total slack") and the slack duration of the path.

Conveniently, a path slack equals the maximal task total slack out of all the tasks that belong to the path. The duration of a path equals the sum of durations of all tasks that belong to the path, assuming there are no parallel tasks in the path. In case of parallel tasks, then the duration of the path is based on summing all the tasks' durations and subtraction of the amount of parallel time units (hours, days, weeks etc.). A duration slack of a path equals the duration of the critical path or the longest path minus the duration of the path. The duration slack (DS) of a path indicates how close is the path to becoming a critical path. Paths that are characterized by small duration paths are hidden critical paths. Conveniently, a duration path threshold is defined and paths that have a slack duration that are smaller than the threshold are regarded as hidden critical paths.

It is noted that the duration of a task can be deterministic or be characterized by a duration distribution. If the duration is not-deterministic it can be characterized by its distribution, by multiple possible values (maximal value, average value, minimal value, standard deviation) that represent the distribution.

Conveniently, the method includes identifying the hidden critical tasks from the Hidden Critical paths.

Conveniently, the method includes locating the option to shorten the project duration from the structure of the project network.

Conveniently, the method includes evaluating the quality of the project network and delivers recommendations how to improve it.

Figure 1:
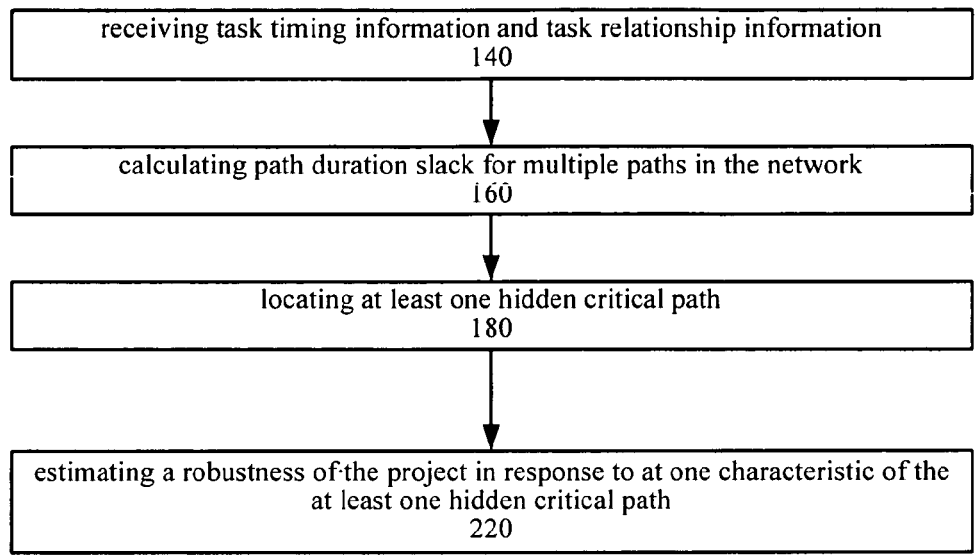
FIG. 1 illustrates a flow chart of a method for evaluating a project, according to an embodiment of the invention.

FIG. 1 illustrates a method 100 according to an embodiment of the invention.

Method 100 starts by stage 140 of receiving task timing information and task relationship information.

Stage 140 is followed by stage 160 of calculating path duration slack for multiple paths in the network.

Stage 160 is followed by stage 180 of locating at least one hidden critical path.

Stage 180 is followed by stage 220 of estimating a robustness of the project in response to at least one characteristic of the at least one hidden critical path. Conveniently, stage 220 includes computing a robustness score that is responsive to the duration of the critical paths of the project and to a distribution of path slack durations of multiple hidden paths including multiple hidden critical paths.

Figure 2:
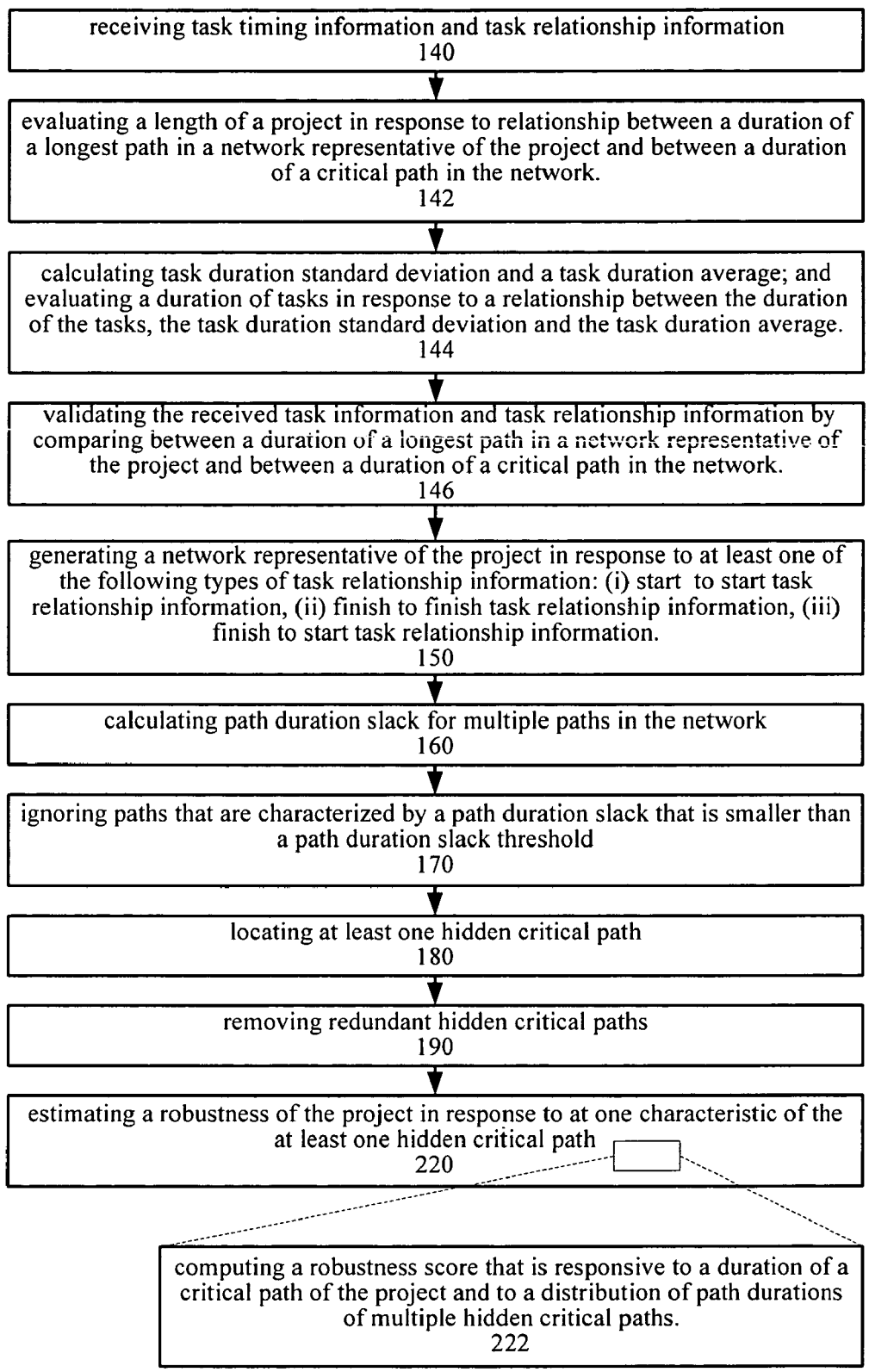
FIG. 2 illustrates a flow chart of a method for evaluating a project, according to another embodiment of the invention.

FIG. 2 illustrated method 101 according to an embodiment of the invention.

Method 101 differs from method 100 by including multiple optional stages. It is noted that analogues methods can include one or more of these optional stages.

Method 101 starts by stage 140 of receiving task timing information and task relationship information.

Combining the factors together results in the project network quality evaluation.

Stage 140 is followed by stage 150 of generating a network representative of the project in response to task relationship information that can include at least one of the following types of task relationship information: (i) start to start task relationship information, (ii) finish to finish task relationship information; (iii) finish to start information, and the like.

Stage 150 may includes performing an initial analysis of the network. The initial analysis can include locating all the tasks without successors.

Assuming that there are N tasks without successors and that N>1 then this can indicate that there are several endpoints to the project or that some connections between tasks are missing.

If there are several end-points to this project the project can be analyzed by uniting all these tasks to one successor, and analyze the project as one, or by analyzing the project as N different projects, each one ends in a different end task.

If connections are missing an error message can be sent. Conveniently, connection can be missing due to various reasons. The addition of the missing connection can affect the analysis or not.

Conveniently, the initial analysis includes locating summary tasks with connections to either predecessors or successors. Even though project management software allows a connection between summary tasks and other tasks or summary tasks, it is recommended not to connect the summary tasks.

Conveniently, the initial analysis can include rejecting start to finish connection as erroneous. Conveniently such connections should be converted to another type of connection.

Stage 150 conveniently includes treating different types of connections information. The following examples will illustrate various examples of tasks and task relationships. It is assumed that two tasks are processed, that task 1 (Task1) is the predecessor while task 2 (Task2) is the successor.

A network can be built by a forward process (starting from the earliest task and moving forward) or by a backward process (starting from the last task and moving backward). If a forward process is implemented than task1 already belongs to the path and stage 150 includes evaluating the affect of adding task2. If a backward process is implemented than task2 already belongs to the path and stage 150 includes evaluating the affect of adding task1.

Finish to finish relationship is represented by FTF while start to start relationship is represented by STS.

S(task1) represents a start of task 1. S(task2) represents a start of task 2. F(task1) represents an end (finish) of task 1. F(task2) represents an end (finish) of task 2. D(task1) represents the duration of task 1. D(task2) represents the duration of task 2.

In a first case F(Task1)=F(Task2) and D(Task1)=D(Task2). The end date of the tasks is identical and the duration of the tasks is the same. Accordingly, the path's duration does not change while adding the new task to the path.

In a second case F(Task1)=F(Task2) and D(Task1)>D(Task2). The end date of the tasks is identical and the duration of Task1 is longer than the duration of Task2. When applying a backward process, the addition of Task1 to the path causes the path's duration to be extended by the time difference between the durations of the two tasks (D(Task1)−D(Task2)). When applying a forward algorithm, the addition of Task2 does not change the path's duration.

In a third case F(Task1)=F(Task2) and D(Task1)<D(Task2). The end date of the tasks is identical and the duration of Task 2 is longer than the duration of Task 1. When applying either a forward process or a backward process the path's duration should include the maximum between: (i) D(Task2) and (ii) D(Task1)+the duration of all the tasks that precede the added task.

In a fourth case S(Task1)=S(Task2) and D(Task1)=D(Task2). The end date of the tasks is identical and the duration of the tasks is the same. Accordingly, the path's duration does not change while adding the new task to the path.

In a fifth case S(task1)=S(Task2) and D(Task1)>D(Task2). The start date of the tasks is identical and the duration of Task1 is longer than the duration of Task2. In this situation, when applying a backwards process or a forward process, that addition of the new task shall alter the duration of the path by a maximum value out of D(Task1) and D(Task2)+the duration of all the tasks after it until the end of the path.

In a sixth case S(Task1)=S(Task2) and D(Task1)<D (Task2). In this situation, when applying a backwards process, the addition of Task1 to the path should not change the path's duration. When applying a forward process the path's duration should be extended by the difference between the durations of the two tasks (D(Task2)−D(Task1)).

In a seventh case S(Task1)<S(Task2)<F(Task1)<F(Task2). In this situation the path's duration is depended on the time differences between the two tasks. When applying a backwards algorithm the difference between the start date of Task 2 and the start date of Task 1 should be added to the path's duration (S(Task2)−S(Task1)). When applying a forward process, the difference between the end date of Task 2 and the end date of Task 1 should be added to the path's duration (F(Task2)−F(Task1)).

In an eighth case S(Task2)<S(Task1)<F(Task2)<F(Task1). When applying a backwards process and when applying a forward process, the two following comparisons should be done: A: The maximum between: D(Task1) and the duration of the path from the date of S(Task 1) until the end of the path. B: The maximum between: D(Task2) and the duration of the path from the date of F(Task 2) until the beginning of the path. To the sum of results of A and B, the duration of the overlap between the two tasks needs to be subtracted (F(Task 2)−S(Task)). There are many ways to calculate that. Another option to receive the same answer—from a different point of reference is: A: The maximum between: i. The time difference between F(Task 1) and F(Task 2). ii. The duration of the path from Task 2 (excluded) until the end of the path. B: The maximum between: i. The time difference between S(Task 1) and S(Task 2). The duration of the path from Task 1 (excluded) until the beginning of the path. To the sum of results of A and B, the duration of the overlap between the two tasks needs to be added (F(Task 2)−S(Task1)).

In a ninth case S(Task1)<S(Task2)<F(Task2)<F(Task1). The path's duration depends on the time differences between the two tasks and the time overlap between the two tasks and the path's duration from Task 2 until the end of the path. In general, both when applying a backwards process or a forward process, the following comparison should be done: The maximum between: i. Task 1 duration minus the time difference between the S(Task 2) and the S(Task1). ii. The duration of the path from Task 2 (included) until the end of the path. In backwards algorithm, the time difference between the two tasks needs to be added (S(Task 2)−S(Task1)) to the result. Another option to receive the same answer could be from a different point of reference as F(Task 2) for example. Another option is to ignore Task 1 duration and take into consideration only the time difference between (S(Task 2)−S(Task1)) and add it to the path's duration as Task 1. This presentation might be accurate enough in most cases.

In a tenth case S(Task2)<S(Task1)<F(Task1)<F(Task2). The path's duration depends on the time differences between the two tasks and the time overlap between the two tasks and the path's duration from Task1 until the beginning of the path. In general, when applying a backwards process or a forward process, the following comparison should be done: The maximum between: i. Task 2 duration minus the time difference between the F(Task 2) and the F(Task1). ii. The duration of the path from Task 1 (included) until the beginning of the path. In backwards algorithm, the time difference between the two tasks needs to be reduced (F(Task 1)−S(Task2)) from the result. In when applying a forward process, the time difference between the two tasks needs to be added (F(Task 2)−F(Task1)) to the result. Another option includes adding the time difference between (F(Task 2)−F(Task1)) to the path's duration as Task2. This presentation might be accurate enough in most cases.

In an eleventh case F(Task1)<S(Task2). This situation is very similar to Finish-to-Start connection (with a positive lag). In this case, the new task's duration is added to the path's duration.

In a twelfth Case No. 12, F(Task2)<S(Task1). This case is not realistic and an error message is generated.

In case of finish-to-start connection, for backwards algorithm the duration of task 1 is added to the path's duration. For forward algorithm, the duration of task 2 is added to the path's duration.

In case of finish-to-start connection with a positive lag, then the path's duration will consists of the addition of the new task's duration plus the lag value.

In case of finish-to-start connection with a negative lag, then the path's duration will consists of the addition of the new task's duration minus the lag value.

Stage 150 is followed by stage 160 of calculating path duration slack for multiple paths in the network.

Stage 160 is followed by stage 170 of ignoring paths that are characterized by a path duration slack that is smaller than a path duration slack threshold.

For example, if T is the duration of the project and r is a threshold coefficient ($0 \leq r \leq 1$) then r=0.8 means that the paths with DS$\leq$(1−r)T=0.2 T will not be ignored.

Stage 170 is followed by stage 180 of locating at least one hidden critical path. This includes looking for paths that their duration is very close to the duration of the critical path.

Stage 180 is followed by stage 190 of removing redundant hidden critical paths. This stage is also illustrated in FIG. 3.

The removal can be based upon the following assumptions: (i) Let X and Y be non-identical paths of a network. If the duration slack of path X equals the duration slack of path Y (DS$_X$=DS$_Y$) then X is not redundant to Y and Y is not redundant to X If two non-identical paths in a network have the same duration slack, then neither one of them is redundant to the other, (ii) Let X and Y be paths of a network. The slack of path X equals x (TS$_X$=x) and the slack of path Y equals y (TS$_Y$=y). If x<y then Y is not redundant to X. If two paths have a different slack then the one with the bigger slack can't be redundant to the one with the smaller slack. For example, the critical path can't consist of any path with a different slack. The same is true for all the slack values (not only for zero). (iii) Let X and Y be paths of a network. The slack of path X equals x (TS$_X$=x) and the slack of path Y equals y (TS$_Y$=y). If X redundant to Y and x<y, then there exists a path Z, such that X redundant to Z and TS$_Z$=x. If two paths have a different slack and the path with the smaller slack is redundant to the path with the bigger slack, then there is another path, which has the same slack as the smaller one, and the first path is redundant to it too. The significance is that in order to look for redundancies, there is no need to look between groups of slack but only within the groups themselves. Once all the paths with their slack and duration were mapped by 'locating the paths' algorithm, then the paths need to be sorted into groups by their slack, since redundancies can be found only within the groups of the slack.

First, all the paths are grouped by the paths' total slack value. In each group, all the paths are sorted by the path's duration slack. Every path in the group is compared with all the other paths. If it is found that all the tasks in one of the paths exist in another path, then this path is identified as a redundant path, and it is removed from the paths list.

Figure 3:
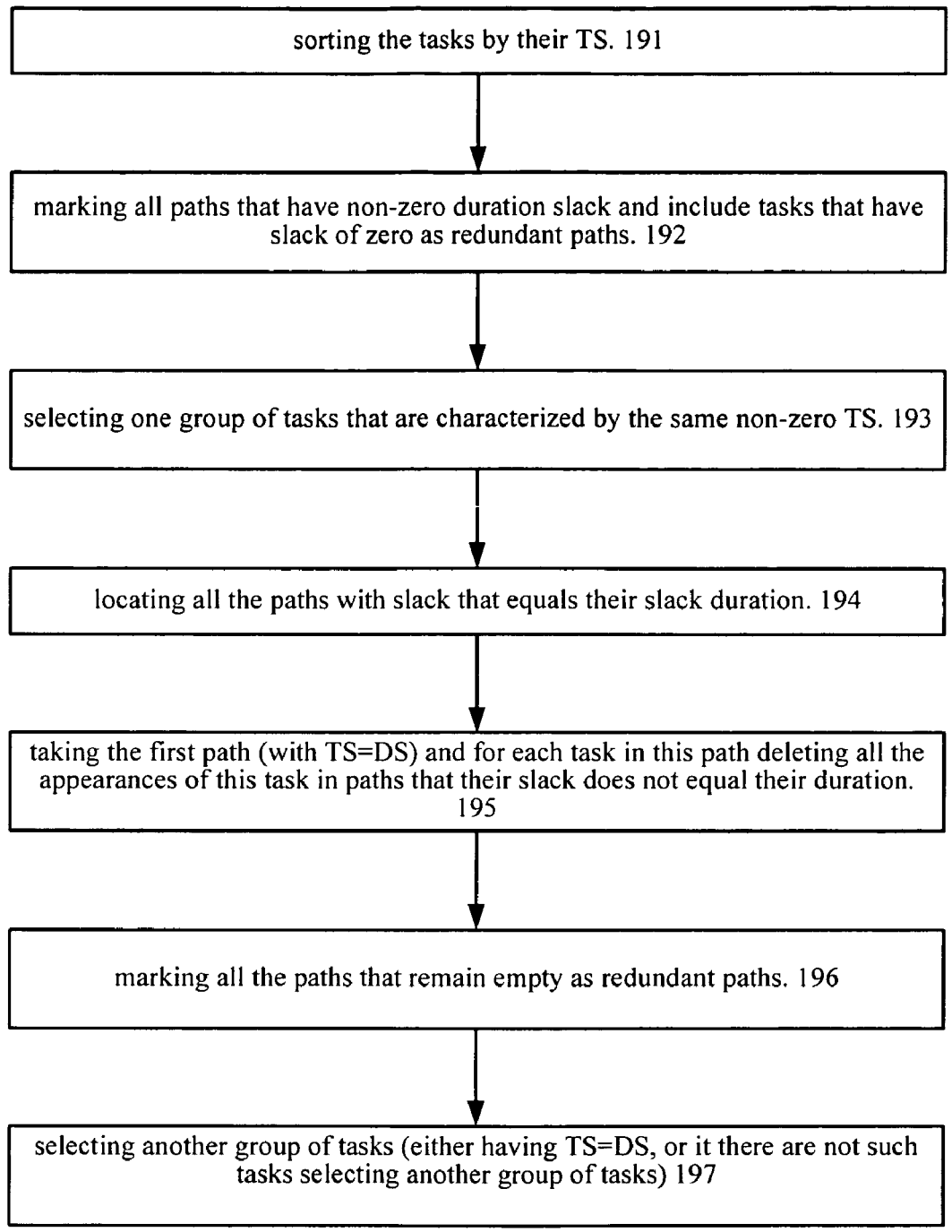
FIG. 3 illustrates a stage of removing a redundant path according to another embodiment of the invention.

FIG. 3 illustrates stage 190 in greater details. Stage 190 starts by stage 191 of grouping the paths by their TS. Stage 191 is followed by stage 192 of sorting, within each group of TS, the paths by their duration slack. Stage 192 is followed by stage 193 of selecting one group of TS. Stage 193 is followed by stage 194 of selecting the path with the smallest DS. Stage 194 is followed by stage 195 of deleting, for each task in the selected path, the appearances of this task in all the other paths. Stage 195 is followed by stage 196 of marking all the paths that remain empty as redundant paths. Stage 196 is followed by stage 197 of selecting the path with next the smallest DS and jumping to stage 195, until the entire group is scanned. When this occurs another group is selected and stage 197 is followed by stage 193.

Referring back to FIG. 2, stage 190 is followed by stage 220 of estimating the robustness of the project in response to one characteristic of at least one hidden critical path. It is noted that the estimation can also be responsive to at least one characteristic of one or more critical paths.

Conveniently, stage 220 includes stage 222 of computing a robustness score that is responsive to the duration of the critical path of the project and to the distribution of path durations of multiple hidden critical paths.

Conveniently, a network's robustness is correlated to the distribution of all the paths in the network. If there are many hidden critical paths with duration close to that of the critical path, then the network is not robust and the due date of the project may be violated.

The robustness score (also referred to as project score or HCP score) can be derived from all the paths' scores in its network. The scores results of all the paths are summed and normalized, in order to receive a number between 0 and 1. If the HCP Score is close to 1, it indicates that the network is not robust and the due date of the project will probably be delayed. A high score will be caused by many HCP's close to the Critical Path. If a network receives a low HCP score (close to 0), this implies that the network is robust and that there are not many HCPs close to the CP.

Those skilled in the art will appreciate that other mathematical formulas can be used for estimating the robustness of the network, and that the values (between 0 and 1) of the HCP score is only an exemplary range of possible HCP score values.

One HCP score is:

$$\frac{\sum_i n_i(T-DS_i) \cdot \frac{e^{-3\frac{DS_i}{T}}}{2}}{\frac{\sum_i n_i(T-DS_i)}{2}} = \frac{\sum_i n_i(T-DS_i) \cdot e^{-3\frac{DS_i}{T}}}{\sum_i n_i(T-DS_i)}$$

Wherein index i indicates an index of a group of paths that have the same (the i'th) slack duration.

Another score was:

$$\frac{\sum_i n_i \cdot \frac{e^{-3\frac{DS_i}{T}}}{2}}{\frac{\sum_i n_i}{2}}$$

Where $DS_i$=Path's Duration Slack Value, $n_i$=Quantity of paths with the $DS_i$ slack, and i=1, 2, 3 . . . . This was the original score tested.

Yet a further score was:

$$\frac{\sum_i n_i \cdot \frac{e^{-3\frac{(DS_i-DS_{i-1})}{T}}}{2}}{\frac{\sum_i n_i}{2}}$$

Where $DS_i$=Path's Duration Slack Value (if i=0 then $DS_{i-1}$=0), $n_i$=Quantity of paths with the $DS_i$ slack, and i=1, 2, 3 . . . . This score takes into consideration the difference in DS between each path to the previous one.

Yet additional scores were:

$$\frac{\sum_i \left( \prod_{j=1}^{i} n_j \cdot \frac{e^{-3\frac{(DS_i-DS_{i-1})}{T}}}{2} \right)}{\sum_i \left( \prod_{j=1}^{i} \frac{n_j}{2} \right)}$$

$$\frac{\sum_i \left( n_i \cdot \frac{e^{-3\frac{DS_i}{T}}}{2} \right) \cdot \left( n_i \cdot \frac{e^{-3\frac{(DS_i-DS_{i-1})}{T}}}{2} \right)}{\sum_i \left( \frac{n_i}{2} \right)^2}, \text{ and}$$

$$\frac{\sum_i n_i(T-DS_i) \cdot \frac{e^{-3\frac{DS_i}{T}}}{2}}{\frac{\sum_i n_i(T-DS_i)}{2}}.$$

Stage 222 is followed by stage 232 of evaluating the length of a project in response to relationship between the duration of the longest path or paths in a network representative of the project and between the duration of the critical path or paths in the network. The duration of the critical path can be calculated by applying CPM techniques. The duration of the longest path can be calculated using the mentioned below methods.

Stage 232 is followed by stage 234 of calculating task duration standard deviation and a task duration average and evaluating a duration of tasks in response to a relationship between the duration of the tasks, the task duration standard deviation and the task duration average.

Conveniently, stage 234 includes locating the tasks whose duration is longer than the sum of the average and the standard deviation. In many cases an indication (warning) should be provided. In many cases these tasks can be composed to shorter tasks.

Stage 234 is followed by stage 236 of validating the received task information and task relationship information by comparing between the duration of the longest path in a network representative of the project and between the duration of a critical path in the network.

If the duration of the longest path (as calculated when the network is built) is longer than the duration of the critical path than an error has occurred. If the duration of the longest path is shorter than the duration of the critical path than the project can be shortened.

Stage 236 is followed by stage 237 of generating a list of the hidden critical tasks from the hidden critical paths. The list can start with all the tasks in the one or more longest paths. Then, per each hidden critical path, only new tasks which are not included in the list are added to the list. This list includes tasks which hold within the highest schedule risks in the project. This list also holds within the hidden critical resources which will be used in the project.

Stage 237 is followed by stage 238 of determining weather the project can be shortened. This stage can be applied on projects such as the following project, although this is not necessarily so. The project includes three summary tasks: A, B and C. In most of the Summary tasks, the first task in summary task B is connected by a finish-to-start connection to the last task of the previous summary task A, and the last task in summary task B connected by a finish-to-start connection to the first task of the next summary task-C. If, for example, an earlier task in summary task B can be connected to the task in summary task C and/or a later task in summary task B can be connected to a task in summary task A, the duration of the project can be shortened.

Stage 238 is followed by stage 239 of evaluating the quality of the project network and delivers recommendations how to improve it. The evaluation can include the following: (i) The number of non-connected tasks from the total number of tasks. This can be as a percentage or as a quantity. (ii) A use of start-to-finish connection will be pointed out as a mistake. (iii) Connection of summary tasks to tasks or different summary tasks is pointed out as not recommended (iv) Recommendation to add a milestone in the end of each summary task.

Method 100 can include generating an analysis report. The analysis report can include: (i) informative details—the project name, the date, the customer name, customer number; (ii) project network details—number of tasks, number of connections, the DS range chosen. The DS range can be responsive to the number of paths in the networks, to previous analyses of this network or similar networks and the like; (iii) paths results—the number of paths identifies, the number of redundant paths, the number of unique paths; (iv) HCP score and its meaning, (v) paths histogram (the number of paths that had a certain DS value); (vi) results of error analysis or initial analysis; (vii) hidden critical path information—task identifier, task name, Path's DS, (viii) a table with the tasks whose duration is longer than the sum of the average and standard deviation task duration; (ix) a list of all the hidden critical path whose performance percentage equal zero (hidden critical paths that did not start yet); (x) a list of the summary tasks which their tasks are connected only between them, and only the first and the last are connected to tasks outside the tasks of the summary task. These cases are a potential locations for project schedule shorting; (xi) a list of the unique paths; and (xii) a list of the redundant paths; (xiii) a list of all tasks which don't have a successor task; (xiv) a list of all summary tasks which are connected to other tasks or summary tasks; (xv) a list of all cases of use of start-to-finish connection (xvi) a list of all problematic cases (as previously defined) (xvii) a list of all locations where milestones should be added.

According to an embodiment of the invention multiple reports are provided. In addition to the mentioned above report a summary report can be provided. A summery report can include multiple characteristics of the project are provided. These characteristics can indicate the likelihood of complying with timing constraints, with budget constraints, with various specification requirements, the quantity of hidden critical paths, the stability of the project.

It is noted that the various constraints can refer to tasks, mile stones or the whole project. Conveniently the summery report includes information relating to risk management (risk quality, risk quantity), resource management (amount of critical resources, resources mobility), quality of the project, likelihood of saving money, possible time to market, required monitoring periods, and the like.

The summery report can include the following text, as well as equivalent texts: "Important highlights for this project: (i) The project's finish date could be early by _____ days!. (ii) The Critical Path is not identical/partially identical to the longest path in the Gantt. This means that at the moment, there is at least one path which needs the project manager urgent attention. Failing to do so, will probably cause unwanted delays in the project. (iii) From total of _____ tasks, there are _____ Critical Tasks and Hidden Critical Tasks! This indicates of a very high-risk/high risk/risky project. (iv) _____ tasks were located as weak control points!; (v) From the project structure, there is a potential for schedule shortening; (vi) There is a reasonable doubt, that this project consists of _____ different projects".

Conveniently, the summary report can also indicate the quality (Gantt quality) of the information used to built the network by indicating the number of tasks that are not connected to other tasks, the number of erroneous connections, the usage of unwanted connections, as well as the presence of inadequate Gantt structure).

Conveniently, the values presented in the summary report are responsive to the HCP score and to the ratio between (i) the number of critical tasks plus hidden critical tasks and (ii) the total number of tasks.

The inventor used a HCP score that ranges between 0 and 1. The inventor also defined the following HCP score ranges (although other ranges can be defined): an HCP score that is smaller than 0.5 indicates that the project is robust, an HCP score that ranges between 0.5 and 0.7 indicates that the project is somewhat not robust, an HCP score that ranges between 0.7 and 0.9 indicates that the project tends to be not robust, and an HCP score that ranges between 0.9 and 1 indicates that the project is not robust.

A method 300 of defining a path duration slack threshold, describes an embodiment of the invention.

Method 300 starts by stage 310 of defining path duration slack threshold.

Stage 310 is followed by stage 320 of generating a network.

Stage 320 is followed by stage 330 of determining whether to update the path duration slack threshold in response to the number of paths and to whether only critical paths were found. If the number of paths is very big (for example it exceed 50,000 paths) or if only critical paths were found then stage 330 is followed by stage 340 of updating the path duration slack threshold and jumping to stage 320. Else, the method 300 determines the value of the path duration slack threshold and ends, by END stage 350.

The inventor performed various iteration of stages 310-350. The inventor started with an initial path duration slack threshold of 0.2 T (T is the duration of the project). If more than 50,000 paths were found the path duration slack threshold was set to 0.1 T and a new network was generated. If, after setting the path duration slack threshold to 0.1 T more than 50,000 paths (or another very high number) were found then the path duration slack threshold was set to 0.05 T. If, after setting the path duration slack threshold to 0.1 T less than 50,000 paths were found and at least some of the paths were non-critical paths then the path duration slack threshold was set to 0.1 T, else it was set to T.

If, after setting the initial path duration slack threshold of 0.2 T less than 50,000 paths were found and at least some of the paths were non-critical paths then the path duration slack threshold was set to 0.2 T. If only critical paths were found then the duration slack threshold was set to 0.5 T. If, after setting the duration slack threshold to 0.5 T only critical paths were found than the duration slack threshold was set to T, else it was maintained at 0.5 T.

Conveniently, the computer readable medium can include instructions that cause a computer to execute method 100 and/or method 101.

The medium can be a disk, a diskette, a type, a CD, a DVD, a memory chip, a component within a memory chip and the like. The medium can be read by applying magnetic, electromagnetic, electric or optical means or any other form of radiation.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following

I claim:

1. A computer program product for evaluating a project that comprises a non-transitory computer usable medium with a computer readable program thereon, wherein the computer readable program when executed on a computer causes the computer to:

receive task timing information and task relationship information;

locate at least one hidden critical path wherein the locating of the at least one hidden path comprises ignoring paths that are characterized by a path duration slack that is smaller than a path duration slack threshold;

estimate a robustness of the project in response to at least one characteristic of the at least one located hidden critical path by calculating a robustness score that is proportional to a sum, over each index i, of $ni*(T-DSi)*e^{-3DSi/T}$; wherein ni indicates a number of paths of the project that have a same slack value (DSi), T indicates a duration of the project and DSi indicates the slack value; and generate a report containing at least the robustness score.

2. The computer program product according to claim 1, wherein the computer readable program when executed on a computer further causes the computer to remove redundant hidden critical paths.

3. The computer program product according to claim 1, wherein the computer readable program when executed on a computer further causes the computer to calculate path duration slack for multiple paths in the network.

4. The computer program product according to claim 1, wherein the computer readable program when executed on a computer further causes the computer to generate a network representative of the project in response to start to start task relationship information.

5. The computer program product according to claim 1, wherein the computer readable program when executed on a computer further causes the computer to generate a network representative of the project in response to finish to finish task relationship information.

6. The computer program product according to claim 1, wherein the computer readable program when executed on a computer further causes the computer to validate the received task information and task relationship information by comparing between a duration of a longest path in a network representative of the project and between a duration of a critical path in the network.

7. The computer program product according to claim 1, wherein the computer readable program when executed on a computer further causes the computer to calculate task duration standard deviation and a task duration average; and evaluating a duration of tasks in response to a relationship between the duration of the tasks, the task duration standard deviation and the task duration average.

8. The computer program product according to claim 1, wherein the computer readable program when executed on a computer further causes the computer to evaluate a length of a project in response to relationship between a duration of a longest path in a network representative of the project and between a duration of a critical path in the network.

9. The computer program product according to claim 1, wherein the computer readable program when executed on a computer further causes the computer to generate a list of the hidden critical tasks from the hidden critical paths.

10. A computer program product for evaluating a project that comprises a non-transitory computer usable medium with a computer readable program thereon, wherein the computer readable program when executed on a computer causes the computer to:

receive task timing information and task relationship information;

locate at least one hidden critical path wherein the locating of the at least one hidden path comprises ignoring paths that are characterized by a path duration slack that is smaller than a path duration slack threshold;

estimate a robustness of the project in response to at least one characteristic of the at least one located hidden critical path by calculating a robustness score that is proportional to a sum, over each index i, of $ni*e^{-3DSi/T}$; wherein ni indicates a number of paths of the project that have a same slack value (DSi), T indicates a duration of the project and DSi indicates the slack value; and generate a report containing at least the robustness score.

* * * * *